US012583181B2

(12) United States Patent     (10) Patent No.:    US 12,583,181 B2
Yuasa et al.             (45) Date of Patent:     Mar. 24, 2026

(54) THERMAL MELTING THREE-DIMENSIONAL PRINTER AND METHOD FOR PRODUCING MOLDED OBJECT

(71) Applicant: KYORAKU CO., LTD., Kyoto (JP)

(72) Inventors: Ryohei Yuasa, Yamato (JP); Tomoyuki Tomita, Yamato (JP)

(73) Assignee: KYORAKU CO., LTD., Kyoto (JP)

( * ) Notice: Subject to any disclaimer, the term of this patent is extended or adjusted under 35 U.S.C. 154(b) by 132 days.

(21) Appl. No.: 18/569,856

(22) PCT Filed: Aug. 23, 2022

(86) PCT No.: PCT/JP2022/031689

§ 371 (c)(1),
(2) Date: Dec. 13, 2023

(87) PCT Pub. No.: WO2023/027061

PCT Pub. Date: Mar. 2, 2023

(65) Prior Publication Data

US 2024/0262037 A1     Aug. 8, 2024

(30) Foreign Application Priority Data

Aug. 27, 2021    (JP) ................................. 2021-138877
Aug. 27, 2021    (JP) ................................. 2021-138886

(51) Int. Cl.
   B29C 64/321       (2017.01)
   B29C 64/118       (2017.01)
            (Continued)

(52) U.S. Cl.
   CPC .......... B29C 64/321 (2017.08); B29C 64/118 (2017.08); B29C 64/209 (2017.08);
            (Continued)

(58) Field of Classification Search
None
See application file for complete search history.

(56) References Cited

U.S. PATENT DOCUMENTS

| | | |
|---|---|---|
| 2018/0079135 A1 | 3/2018 | Duis et al. |
| 2018/0126636 A1 | 5/2018 | Jang |
| 2018/0370147 A1 | 12/2018 | Peter et al. |

(Continued)

FOREIGN PATENT DOCUMENTS

| | | | | |
|---|---|---|---|---|
| CN | 107283821 A | * 10/2017 | .............. | A23P 30/20 |
| JP | S4812359 U | 2/1973 | | |

(Continued)

OTHER PUBLICATIONS

International Search Report issued on Nov. 8, 2022, in corresponding International Application No. PCT/JP2022/031689; 7 pages.

(Continued)

*Primary Examiner* — Susan D Leong
*Assistant Examiner* — Xinwen Ye
(74) *Attorney, Agent, or Firm* — Maier & Maier, PLLC

(57) ABSTRACT

Provided is a thermal melting three-dimensional printer capable of preventing molding defects. According to the present invention, there is provided a thermal melting three-dimensional printer comprising an extruder, and a push-in mechanism, wherein the extruder includes a hopper, a cylinder, and a nozzle, the hopper is configured to feed pellets into the cylinder through a raw material feed port provided in the cylinder, the extruder is configured to melt and knead, in the cylinder, the pellets fed into the cylinder to form a molten resin and to extrude the molten resin through the nozzle to form a strand, and the push-in mechanism is configured to push pellets loaded on a loading surface of the hopper into the cylinder through the raw material feed port.

2 Claims, 6 Drawing Sheets

(51) Int. Cl.

| | |
|---|---|
| *B29C 64/209* | (2017.01) |
| *B29C 64/241* | (2017.01) |
| *B29C 64/393* | (2017.01) |
| *B33Y 10/00* | (2015.01) |
| *B33Y 30/00* | (2015.01) |
| *B33Y 50/02* | (2015.01) |

(52) U.S. Cl.

CPC .......... *B29C 64/241* (2017.08); *B29C 64/393* (2017.08); *B33Y 10/00* (2014.12); *B33Y 30/00* (2014.12); *B33Y 50/02* (2014.12); *B29K 2995/0097* (2013.01)

(56) References Cited

U.S. PATENT DOCUMENTS

| | | | |
|---|---|---|---|
| 2019/0001576 A1 | 1/2019 | Eller et al. | |
| 2019/0366628 A1* | 12/2019 | Guillory | ............... B29C 64/106 |
| 2021/0031422 A1* | 2/2021 | Yamashita | ............... B29C 45/50 |
| 2021/0162674 A1* | 6/2021 | Kim | ....................... B33Y 40/00 |
| 2022/0105675 A1 | 4/2022 | Yuasa et al. | |
| 2022/0143914 A1* | 5/2022 | Morrison | ................ B29C 48/05 |
| 2023/0382045 A1* | 11/2023 | Bonilla | ................. B29C 64/205 |

FOREIGN PATENT DOCUMENTS

| | | | |
|---|---|---|---|
| JP | H08229948 | A | 9/1996 |
| JP | 2016107462 | A | 6/2016 |
| JP | 3205939 | U | 8/2016 |
| JP | 2019500252 | A | 1/2019 |
| JP | 2020015185 | A | 1/2020 |
| JP | 2020146988 | A | 9/2020 |
| JP | 2021024148 | A | 2/2021 |
| JP | 2021160101 | A | 10/2021 |
| WO | 2020173704 | A1 | 9/2020 |
| WO | 2021031824 | A1 | 2/2021 |

OTHER PUBLICATIONS

Partial Supplementary Report issued on Nov. 18, 2024, in corresponding European Application No. 22861349.3, 12 pages.

Office Action issued on Dec. 3, 2024, in corresponding Japanese Application No. 2021-138886, 6 pages.

Office Action issued on Aug. 27, 2024, in corresponding Japanese Application No. 2021-138886, 6 pages.

* cited by examiner

THERMAL MELTING THREE-DIMENSIONAL PRINTER AND METHOD FOR PRODUCING MOLDED OBJECT

TECHNICAL FIELD

The present invention relates to a thermal melting three-dimensional printer and a method for producing a molded object.

BACKGROUND ART (First Viewpoint)

Patent Literature 1 discloses a method for producing a molded object by forming a strand by melting pellets constituted by a thermoplastic elastomer using a screw type extruder and extruded from a nozzle, and scanning the strand.

(Second Viewpoint)

Patent Literature 1 discloses a method for molding a molded object having a three-dimensional network structure by laminating a single-layer structure formed by scanning a strand of resin in a molten state.

CITATION LIST

Patent Literature

[Patent Literature 1] JP-A-2020-146988

SUMMARY OF INVENTION

Technical Problem (First Viewpoint)

In a case where the surface of the pellets is sticky when pellets are fed through a hopper into the cylinder of an extruder, the pellets may stick to each other on the hopper, the so-called bridging phenomenon may occur. When the bridging phenomenon occurs, the pellets are not sufficiently fed into the cylinder, leading to molding defects.

The present invention has been made in view of such circumstances, and an object thereof is to provide a thermal melting three-dimensional printer capable of preventing molding defects.

(Second Viewpoint)

In the method of Patent Literature 1, the thickness of the strand may fluctuate during the molding, and in such cases, resulting in defective sites such as sites where the linear resin constituting the three-dimensional network structure inside the molded object is too thin or too thick. The occurrence of such defective sites causes variations in the quality of molded objects.

Although it is possible to inspect whether or not there are defective sites inside the molded object using CT scan, there is a problem, in addition to the high cost for the installation, that the inspection efficiency is low.

The present invention has been made in view of such circumstances, and an object thereof is to provide a method for producing a molded object capable of inspecting the presence or absence of internal defects of a molded object without using CT scan.

Solution to Problem (First Viewpoint)

According to the present invention, there is provided a thermal melting three-dimensional printer comprising an extruder, and a push-in mechanism, wherein the extruder includes a hopper, a cylinder, and a nozzle, the hopper is configured to feed pellets into the cylinder through a raw material feed port provided in the cylinder, the extruder is configured to melt and knead, in the cylinder, the pellets fed into the cylinder to form a molten resin and to extrude the molten resin through the nozzle to form a strand, and the push-in mechanism is configured to push pellets loaded on a loading surface of the hopper into the cylinder through the raw material feed port.

In the three-dimensional printer of the present invention, the push-in mechanism of the above configuration pushes pellets into the cylinder, thereby preventing molding defects caused by insufficient feeding of the pellets.

Hereinafter, various embodiments of the present invention will be presented by way of example. The following embodiments may be combined with each other.

Preferably, in the three-dimensional printer described above, the push-in mechanism includes a rod in contact with the pellet and a driving mechanism that drives the rod, wherein the rod is driven such that a tip of the rod presses the pellets in a direction of the raw material feed port.

Preferably, in the three-dimensional printer described above, the rod includes a soft portion, the rod is driven such that the tip of the rod moves in the direction of the raw material feed port in a state where the rod is curved at the soft portion.

Preferably, in the three-dimensional printer described above, the driving mechanism is configured to rotate about a rotating axis extending in a non-vertical direction with respect to a root of the rod.

(Second Viewpoint)

According to the present invention, there is provided a method for producing a molded object, comprising the step of laminating molding, wherein in the laminating molding, a molded object is molded by laminating a single-layer structure formed by moving a head while discharging a resin strand in a flowing state from the head, and the molded object is subjected to an inspection based on data obtained during the molding.

In the method of the present invention, the molded object is subjected to an inspection based on data obtained during the molding. For this reason, it is possible to inspect the presence or absence of internal defects in the molded object without using CT scan.

Hereinafter, various embodiments of the present invention will be presented by way of example. The following embodiments may be combined with each other.

Preferably, in the method described above, the data includes a weight of the molded object at a time point during the molding.

Preferably, in the method described above, the data includes a thickness of the strand at a time during the molding.

Preferably, in the method described above, wherein the inspection is performed during the molding, and in a case where a result of the inspection is failed, the molding is discontinued.

BRIEF DESCRIPTION OF DRAWINGS (First Viewpoint)

FIG. 1A is a front view showing a thermal melting three-dimensional printer 1 of an embodiment of the present invention (cylinder 2b is shown in a cross-sectional view), and FIG. 1B is a right side view of a push-in mechanism 3 in FIG. 1A.

(Second Viewpoint)

Figure 4:
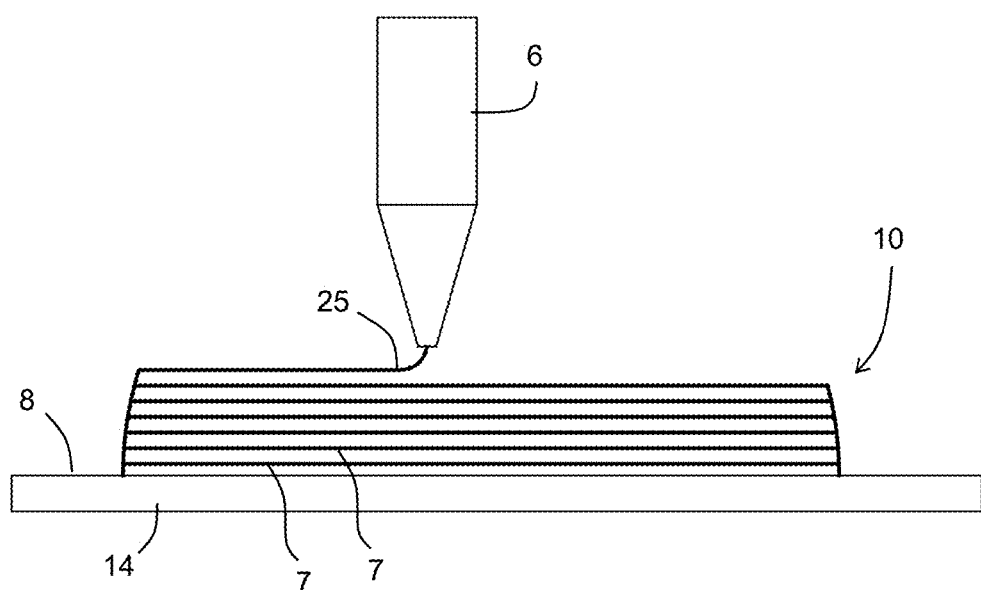

FIG. 4 is a cross-sectional view showing a laminating molding step.

Figure 5A:
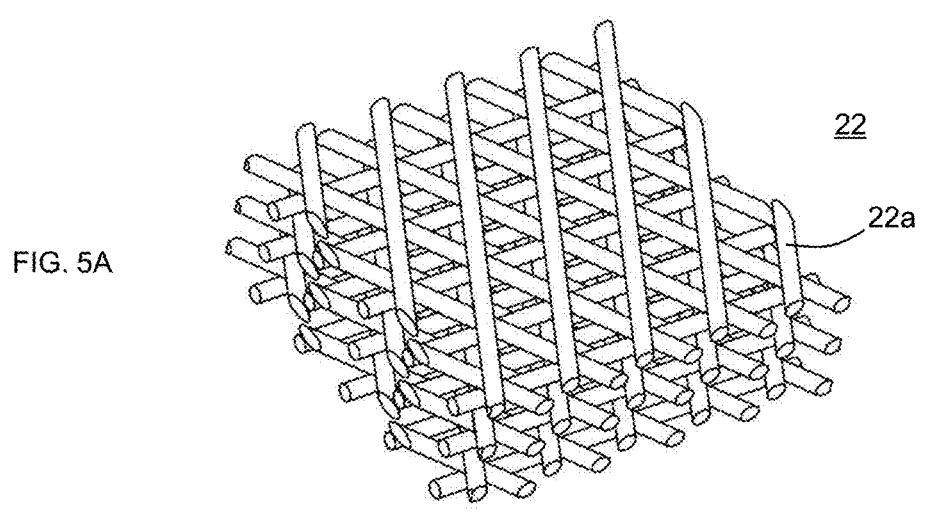
Figure 5B:
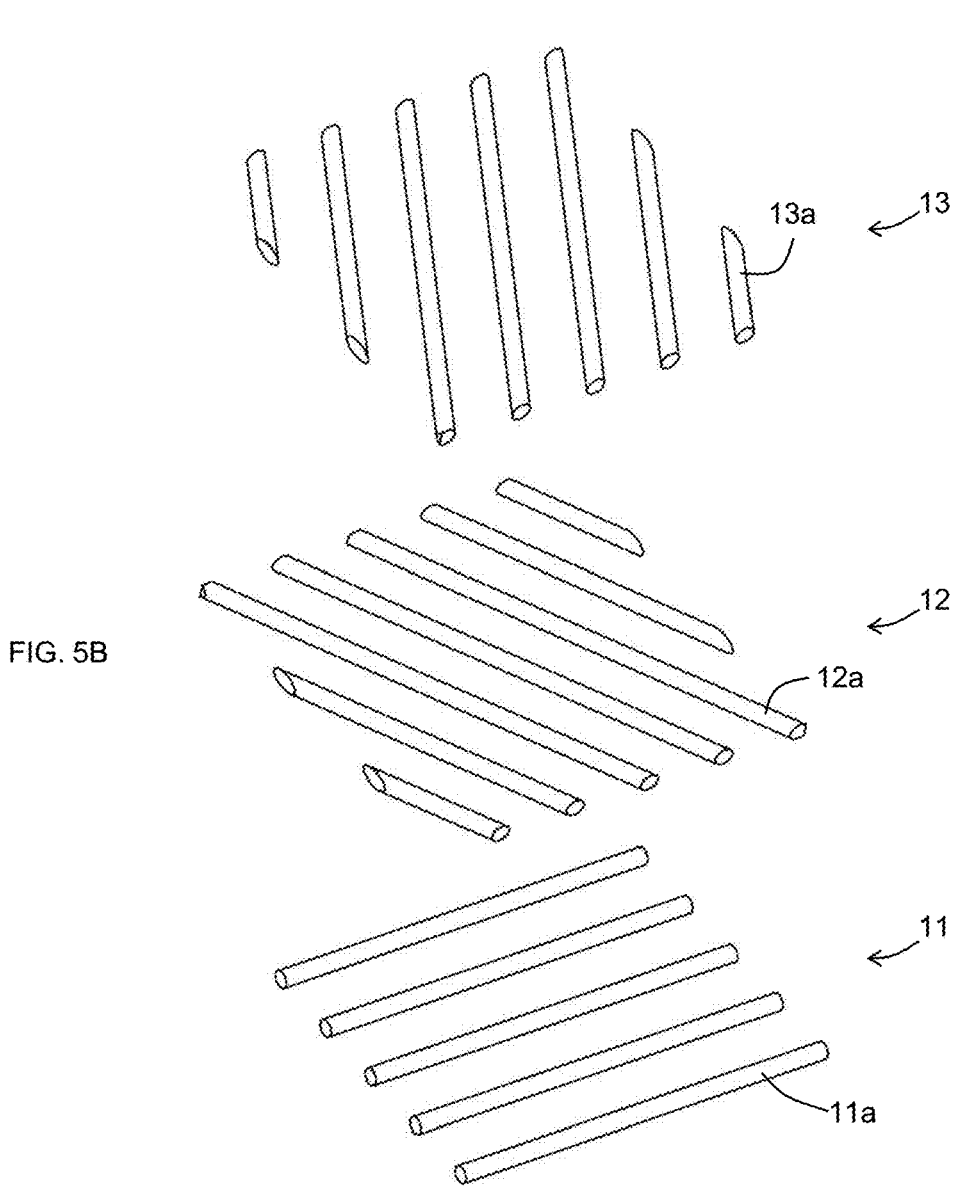

FIG. 5A is a perspective view showing a three-dimensional network structure 22, and FIG. 5B is a perspective view showing a single-layer structure.

Figure 6:
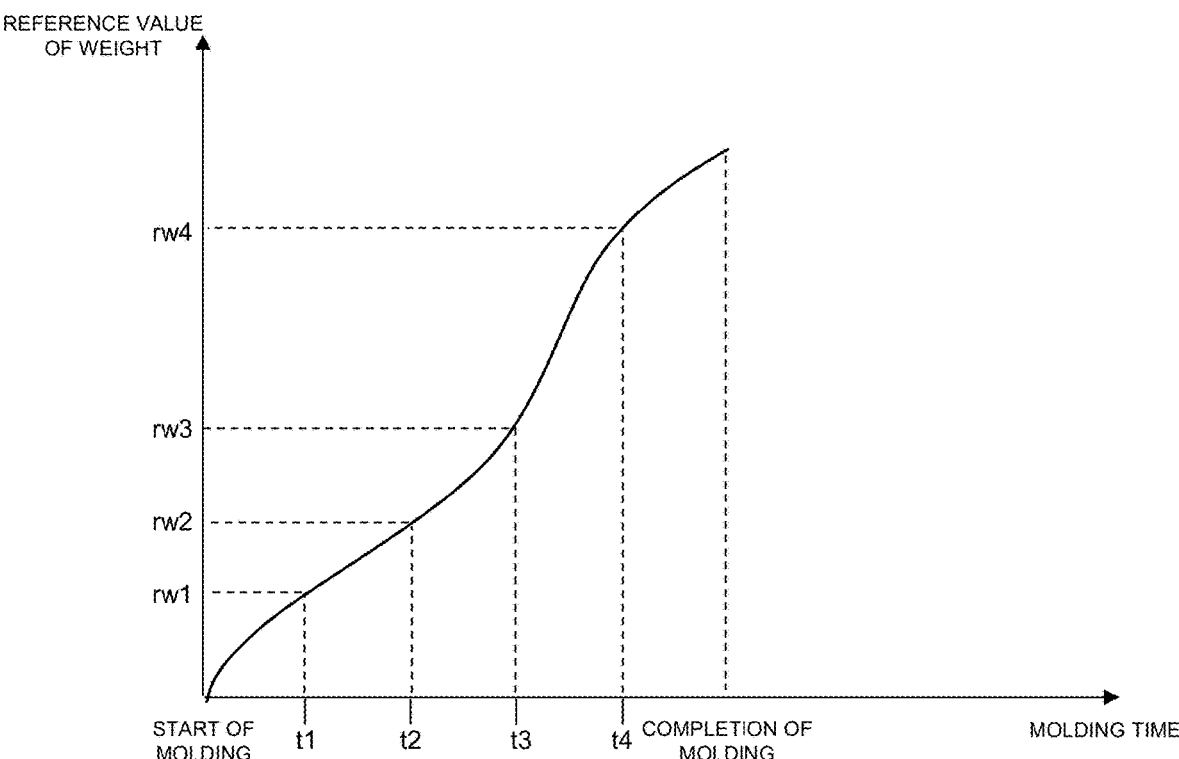

FIG. 6 is a graph showing a relationship between molding time, from start of molding to completion of molding, and a reference value of weight.

DESCRIPTION OF EMBODIMENTS

Hereinafter, embodiments of the present invention will be described. Various characteristic features shown in the following embodiments may be combined with each other. In addition, the scope of the present invention is established independently for each of the features. The contents described in different perspectives may also be combined with each other.

(First Viewpoint)

As shown in FIG. 1, a thermal melting three-dimensional printer 1 of an embodiment of the present invention includes an extruder 2 and a push-in mechanism 3.

<Extruder 2>

The extruder 2 includes a hopper 2a, a cylinder 2b, and a nozzle 2c. The hopper 2a is configured to feed pellets 4 into the cylinder 2b through a raw material feed port 2b1 provided in the cylinder 2b. The raw material feed port 2b1 is preferably provided on the side of the cylinder 2b. The hopper 2a is preferably mounted on the cylinder 2b, and is still more preferably mounted on the side of the cylinder 2b.

The extruder 2 is configured to melt and knead, in the cylinder 2b, the pellets 4 fed into the cylinder 2b to form a molten resin 4a and to extrude the molten resin 4a through the nozzle 2c to form a strand 5. A screw 2d is disposed in the cylinder 2b, and a motor 2e rotates the screw 2d to melt and knead the pellets 4 to form the molten resin 4a and convey the molten resin 4a toward the tip of the cylinder 2b, where the molten resin 4a is pushed out through the nozzle 2c.

The diameter of the screw 2d is, for example, 5 to 80 mm, and preferably 10 to 60 mm. Specifically, this diameter is, for example, 5, 10, 20, 30, 40, 50, 60, 70, or 80 mm, and may be within the range between any two numerical values exemplified here.

The strand 5 is linear, and the diameter thereof is, for example, 0.5 to 6.0 mm, preferably 1.0 to 4.0 mm. Specifically, this diameter is, for example, 0.5, 1.0, 1.5, 2.0, 2.5, 3.0, 3.5, 4.0, 4.5, 5.0, 5.5, or 6.0 mm, and may be within the range between any two numerical values exemplified here.

The pellets 4 are loaded on a loading surface 2a1 of the hopper 2a. The loading surface 2a1 preferably has an angle of 0 to 80 degrees, and still more preferably 15 to 60 degrees, with respect to the horizontal plane. Specifically, this angle is, for example, 0, 5, 10, 15, 20, 25, 30, 35, 40, 45, 50, 55, 60, 65, 70, 75, or 80 degrees, and may be within the range between any two numerical values exemplified here.

The width (length in the depth direction of FIG. 1A) and the height of the raw material feed port 2b1 are each 1 to 10 cm, and preferably 2 to 8 cm, for example. Specifically, the width and height are each, for example, 1, 2, 3, 4, 5, 6, 7, 8, 9, or 10 cm, and may be within the range between any two numerical values exemplified here.

The extruder 2 may be moved three-dimensionally (move in the XYZ directions) by a driving mechanism not shown. By scanning the extruder 2 two-dimensionally (moving the extruder 2 along a predetermined path) while discharging the strand 5 from the nozzle 2c, a single-layer structure can be formed, and by laminating the single-layer structures, a desired molded object can be formed.

<Push-In Mechanism 3>

The push-in mechanism 3 is configured to push the pellets 4 loaded on the loading surface 2a1 of the hopper 2a into the cylinder 2b through the raw material feed port 2b1. The loading surface 2a1 is usually an inclined surface that lowers toward the raw material feed port 2b1, and the pellets 4 are expected to be fed into the cylinder 2b by their own weight. However, in a case where the surface of the pellets 4 is sticky, the pellets 4 may stick to each other on the hopper 2a, and so-called bridging phenomenon may occur. When the bridging phenomenon occurs, it is difficult for the pellets 4 to be fed into the cylinder 2b by their own weight, resulting in insufficient feeding of the pellets 4, which leads to molding defects. On the other hand, in the present embodiment, the push-in mechanism 3 pushes the pellets 4 into the cylinder 2b, and this configuration allows the pellets 4 to be sufficiently fed into the cylinder 2b even in a case where the surface of the pellets 4 is sticky, thereby preventing molding defects caused by insufficient feeding of the pellets 4.

In the present embodiment, the push-in mechanism 3 includes a rod 3a in contact with the pellets 4 and a driving mechanism 3b that drives the rod 3a. The push-in mechanism 3 is preferably mounted on the extruder 2, and is still more preferably mounted on the upper part of the extruder 2.

Figures 1A, 1B:
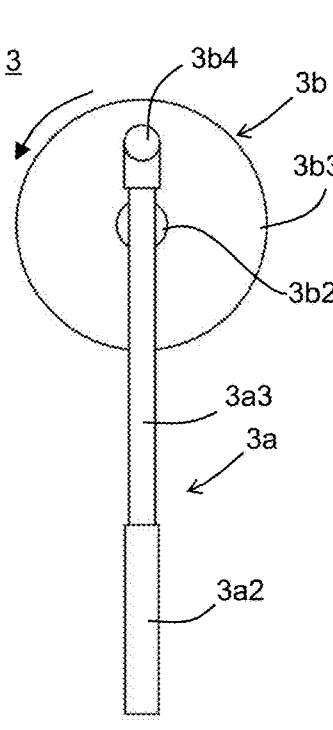
Figures 2A, 2B:
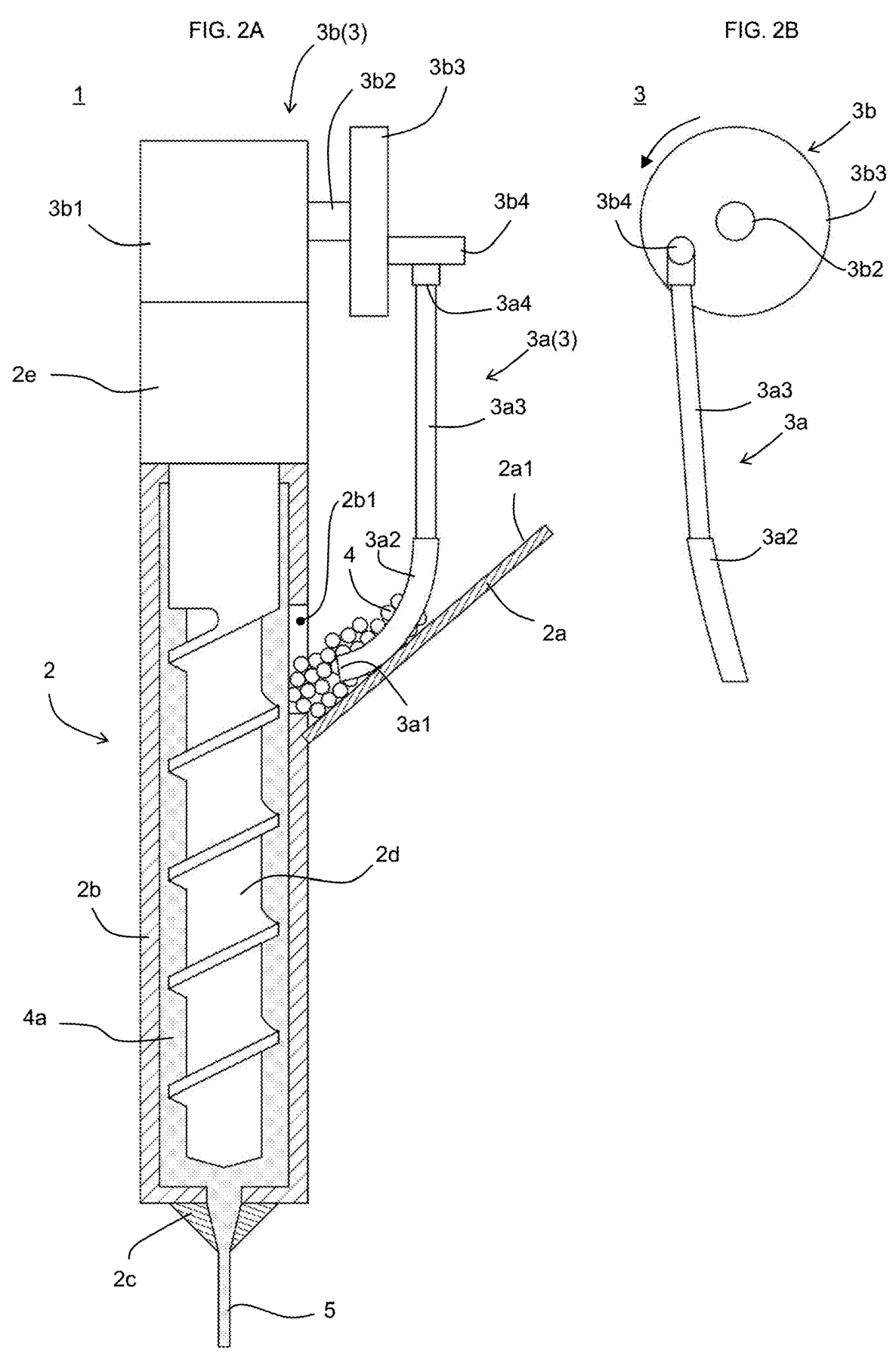
FIG. 2 shows states after a rod 3a is lowered from the state of FIG. 1, and FIGS. 2A to 2B correspond to FIGS. 1a to 1b, respectively.
Figures 3A, 3B:
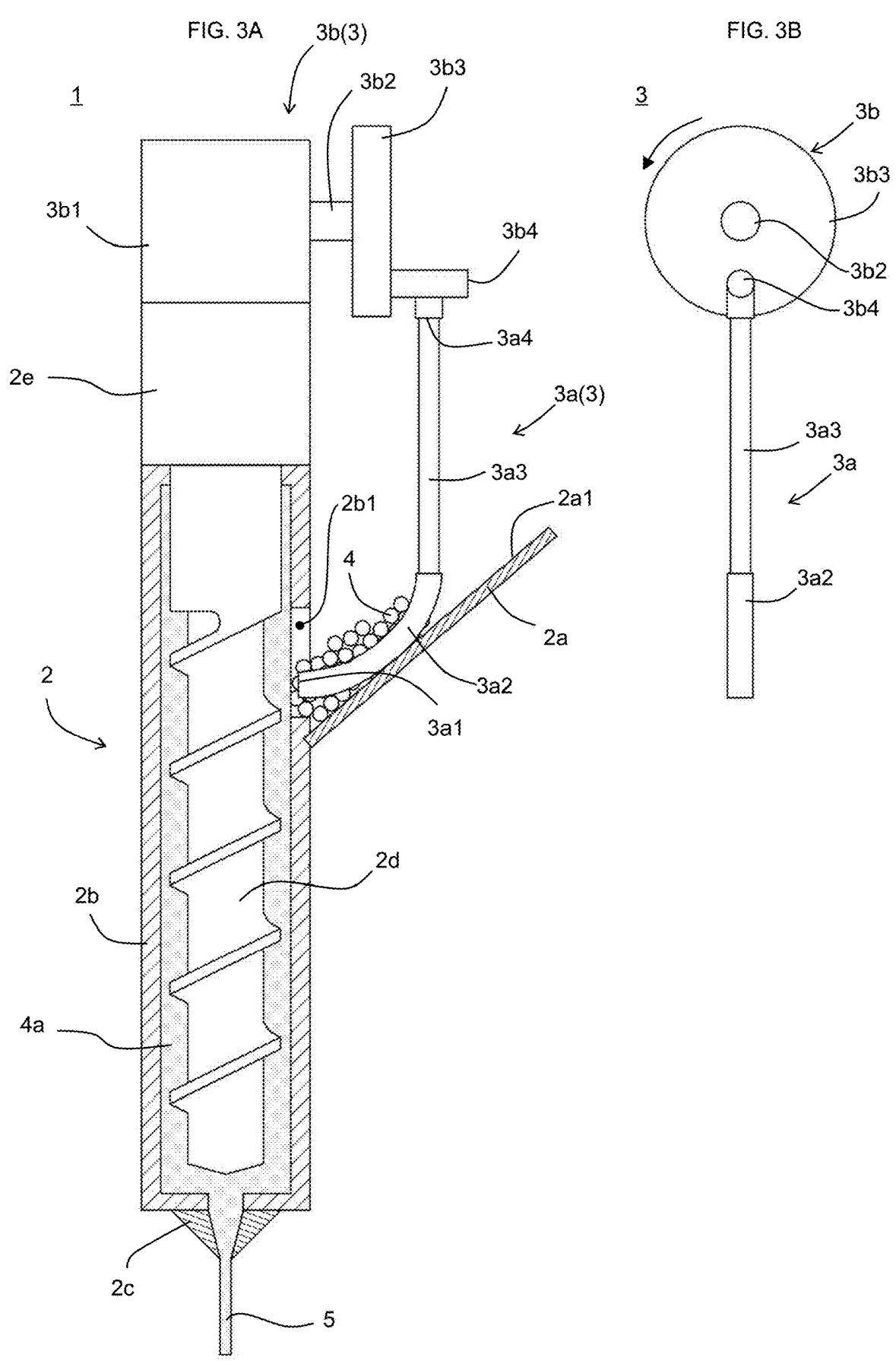
FIG. 3 shows states after the rod 3a is further lowered from the states of FIG. 2, and FIGS. 3A to 3B correspond to FIGS. 1a to 1b, respectively.

The rod 3a is driven such that the tip 3a1 of the rod 3a presses the pellets 4 in the direction of the raw material feed port 2b1. In order to eliminate the bridging phenomenon of pellets 4, it is conceivable to collapse the bridge of pellets 4 with a piston that moves in the vertical direction. However, in such a configuration, although the bridge is collapsed, the pellets 4 may stick to other pellets, and the insufficient feeding of pellets 4 may not be fully eliminated. On the other hand, in the push-in mechanism 3 of the present embodiment, the tip 3a1 of the rod 3a does not simply move in the vertical direction, but is driven to press the pellets 4 in the direction of the raw material feed port 2b1, as shown in FIGS. 1 to 3. According to such a configuration, the bridge of the pellets 4 is broken by pressing by the tip 3a1 and the pellets 4 are moved in the direction of the raw material feed port 2b1, so that the feeding of the pellets 4 into the cylinder 2b is promoted compared to the cases where the tip 3a1 is moved in the vertical direction.

The diameter of the tip 3a1 of the rod 3a is, for example, 1 to 30 mm, preferably 1 to 20 mm, and still more preferably 3 to 15 mm. Specifically, this diameter is, for example, 1, 2, 3, 4, 5, 6, 7, 8, 9, 10, 11, 12, 13, 14, 15, 16, 17, 18, 19, 20, 25, or 30 mm, and may be within the range between any two numerical values exemplified here.

The rod 3a preferably includes a soft portion 3a2. The soft portion 3a2 is a portion that is curved when the rod 3a is pressed against the loading surface 2a1, and is constituted by a soft material such as rubber. The flexural modulus of the soft portion 3a2 is preferably 70 to 700 MPa, for example. Specifically, this flexural modulus is, for example, 70, 80, 90, 100, 250, 400, 550, or 700 MPa, and may be within the range between any two numerical values exemplified here. The rod 3a may be constituted only by the soft portion 3a2, and are preferably constituted by the soft portion 3a2 and a hard portion 3a3 made of a material having a higher flexural modulus. The hard portion 3a3 is preferably disposed at a position further from the tip 3a1 than the soft portion 3a2 is. Further, the tip 3a1 is preferably provided in the soft portion 3a2. The flexural modulus may be measured in accordance with JIS K7171.

The length of the soft portion 3a2 (the length of the longitudinal direction when the soft portion 3a2 is straightened) is preferably 2 cm or more, and still more preferably 3 cm or more. The length of the soft portion 3a2 is, for example, 2 to 30 cm, specifically, for example, 2, 3, 4, 5, 10, 15, 20, 25, or 30 cm, and may be within the range between any two numerical values exemplified here or may be any one of the numerical values exemplified here or more. The soft portion 3a2 may have a constant cross-sectional shape over the entire length, for example, tapering toward the tip 3a1.

The rod 3a is preferably driven such that the tip 3a1 of the rod 3a moves in the direction of the raw material feed port 2b1 in a state where the rod 3a is curved at the soft portion 3a2. According to such a configuration, when the root 3a4 of the rod 3a is moved in the downward direction, the tip 3a1 of the rod moves in the direction of the raw material feed port 2b1, and when the root 3a4 of the rod 3a is moved in the upward direction, the tip 3a1 of the rod moves in the direction away from the raw material feed port 2b1. That is, the motion in the vertical direction of the root 3a4 of the rod 3a is converted into a motion of the tip 3a1 of the rod 3a approaching or moving away from the raw material feed port 2b1.

As the driving mechanism 3b, any mechanism capable of operating the rod 3a as described above may be employed, and examples thereof include a cylinder mechanism and a rotating mechanism. Examples of the cylinder mechanism include a mechanism for reciprocating the root 3a4 of the rod 3a in the vertical direction. Examples of the rotating mechanism include a mechanism capable of converting rotational motion into reciprocating motion in the vertical direction of the root 3a4 of the rod 3a.

The driving mechanism 3b of the present embodiment is a rotating mechanism, and includes a motor 3b1, a motor shaft 3b2, a disk 3b3, and a bracket 3b4.

The motor shaft 3b2 rotates driven by the motor 3b1. The direction of rotation of the motor shaft 3b2 is, for example, counterclockwise as seen from the disk 3b3 side, as shown in FIG. 1B. The disk 3b3 is fixed to the motor shaft 3b2, and the bracket 3b4 is fixed to the disk 3b3. The bracket 3a4 of the rod 3a is fixed to the bracket 3b4. For this reason, as shown in FIGS. 2 to 3, the disk 3b3, the bracket 3b4, and the root 3a4 also rotate as the motor shaft 3b2 rotates. The direction of the motor shaft 3b2 coincides with the rotation axis of the member that rotates as the motor shaft 3b2 rotates. The root 3a4 is fixed at a position deviated from the rotation axis of the motor shaft 3b2. For this reason, the position of the root 3a4 moves as the motor shaft 3b2 rotates.

The motor shaft 3b2 is oriented in a non-vertical direction, so its vertical position fluctuates periodically as the root 3a4 rotates. Therefore, by rotating the motor shaft 3b2, the root 3a4 can be reciprocated in the vertical direction. The motor shaft 3b2 preferably has an angle of 45 degrees or less, and still more preferably 30 degrees or less, with respect to the horizontal plane. This angle is, for example, 0 to 45 degrees, specifically, for example, 0, 5, 10, 15, 20, 25, 30, 35, 40, or 45 degrees, and may be within the range between any two numerical values exemplified here or may be any one of the numerical values exemplified here or less.

As the motor shaft 3b2 rotates, the root 3a4 reciprocates not only in the vertical direction, but also in the left and right direction (direction perpendicular to both the vertical direction and the rotation axis direction of the motor shaft 3b2) in FIG. 1B. When the root 3a4 reciprocates in the left and right direction, the tip 3a1 and its neighboring parts also reciprocate in the left and right direction, making the bridge even more susceptible to collapse.

The amplitude of the tip 3a1 in reciprocating motion (the length between the position closest to the raw material feed port 2b1 and the position farthest from the raw material feed port 2b1) is, for example, 0.5 cm or more, and preferably 1 cm or more. The amplitude is, for example, 0.5 to 10 cm, specifically, for example, 0.5, 1, 2, 3, 4, 5, 6, 7, 8, 9, or 10 cm, and may be within the range between any two numerical values exemplified here or may be any one of the numerical values exemplified here or more.

During the reciprocating motion, the tip 3a1 may or may not enter inside the outer peripheral surface of the cylinder 2b. The distance from the tip 3a1 to the outer peripheral surface of the cylinder 2b when the tip 3a1 is in closest contact with the cylinder 2b is preferably 10 cm or less, and still more preferably 5 cm or less. The distance is, for example, −2 cm to 10 cm, preferably −0.5 cm to 0.5 cm, specifically, for example, −2, −1, −0.5, −0.1, 0, 0.1, 0.5, 1, 2, 3, 4, 5, 6, 7, 8, 9, or 10 cm, and may be within the range between any two numerical values exemplified here or may be any one of the numerical values exemplified here or less. A negative value means the distance that the tip 3a1 has entered inside the outer peripheral surface of the cylinder 2b.

<Pellets 4>

The pellets 4 are not particularly limited, but thermoplastic elastomers are preferred.

The pellets 4 are in granular form that can be fed into the extruder 2. The shape of the pellets 4 is not particularly limited, but may be, for example, spherical, elongated, or the like. When the length of the longest portion of the pellets 4 (in the case of elongated sphere, the length in the major axis direction) is L, and the diameter in the plane perpendicular to the longest portion (in the case of elongated sphere, the length in the minor axis direction) is D, L/D is, for example, 1 to 10, and preferably 1 to 5. L is, for example, 0.5 to 10 mm, and preferably 2 to 8 mm. Specifically, L/D is, for example, 1, 2, 3, 4, 5, 6, 7, 8, 9, or 10, and may be within the range between any two numerical values exemplified here. Specifically, L is, for example, 0.5, 1, 2, 3, 4, 5, 6, 7, 8, 9, or 10 mm, and may be within the range between any two numerical values exemplified here.

Examples of the thermoplastic elastomer include styrene elastomers, olefin elastomers, and acrylic elastomers. The thermoplastic elastomer preferably contains a styrene elastomer. Since styrene elastomers are highly flexible, the inclusion of styrene elastomers in thermoplastic elastomers increases the flexibility of the thermoplastic elastomer. The ratio of styrene elastomer in the thermoplastic elastomer is preferably 50 to 100% by mass, and still more preferably 80 to 100% by mass, and specifically, the ratio is, for example, 50, 60, 70, 80, 90, or 100% by mass, and may be within the range between any two numerical values exemplified here.

Styrene elastomers are thermoplastic elastomers having a styrene unit, and examples thereof include a blend of one or two selected from styrene-ethylene-styrene block copolymers (SES), styrene-butadiene-styrene block copolymers (SBS), styrene-isoprene-styrene block copolymers (SIS), styrene-butadiene rubber (SBR), styrene-butadiene-styrene block copolymer (SBS), styrene-isoprene-styrene block copolymer (SIS), styrene-butadiene rubber (SBR)), hydrogenated styrene copolymers (for example, styrene-ethylene propylene-styrene block copolymer (SEPS), styrene-ethylene butylene-styrene block copolymer (SEBS), styrene butylene-butadiene-styrene block copolymer (SBBS), and hydrogenated styrene-butadiene rubber (HSBR)).

The Shore A hardness of the thermoplastic elastomer is preferably 0 to 10, and still more preferably 0 to 2. Since the pellets 4 having such physical properties tend to have a sticky surface, the technical significance of performing molding using the three-dimensional printer 1 of the present embodiment is remarkable. Specifically, the Shore A hardness is, for example, 0, 1, 2, 3, 4, 5, 6, 7, 8, 9, or 10, and may be within the range between any two numerical values exemplified here. In a case where the Shore A hardness is within this range, a molded object excellent in flexibility can be obtained. The Shore A hardness is measured based on JIS K6253.

The melt flow rate (hereinafter referred to as "MFR") of the thermoplastic elastomer is preferably 10 to 200 g/10 minutes, and still more preferably 60 to 140 g/10 minutes. In this case, it is easy to achieve high molding accuracy. Specifically, MFR is, for example, 10, 20, 30, 40, 50, 60, 70, 80, 90, 100, 110, 120, 130, 140, 150, 160, 170, 180, 190, or 200 g/10 minutes, and may be within the range between any two numerical values exemplified here. The MFR is measured at a measurement temperature of 150° C. and a test load of 2.16 kg in accordance with JIS K-7210.

The angle of repose of the pellets 4 is preferably 35 degrees or more. Since a bridging phenomenon is likely to occur in such a pellets 4, the technical significance of performing molding using the three-dimensional printer 1 of the present embodiment is remarkable. The angle of repose is, for example, 35 to 80 degrees, specifically, for example, 35, 36, 37, 38, 39, 40, 41, 42, 43, 44, 45, 50, 55, 60, 65, 70, 75, or 80 degrees, and may be within the range between any two numerical values exemplified here or may be any one of the numerical values exemplified here or more. The angle of repose may be measured by the following methods.
(1) First, the pellets 4 are injected from the vertical direction on a horizontal measurement table (diameter 10.5 cm) to form a pile of the pellets 4. The pellets 4 are injected until the pellets 4 overflows from the measurement table.
(2) Next, at an edge of the upper surface of the measurement table, the inclination angle from the horizontal plane of the pile of the pellets 4 is measured with a protractor, and the obtained measurement value is taken as the angle of repose.

EXAMPLE

1. Example 1

The three-dimensional printer 1 shown in FIG. 1 was used to mold the molded object. The soft portion 3*a*2 was a diameter of 0.6 cm, a length of 4 cm, and a flexural modulus of 300 MPa. The rod 3*a* was driven such that the root 3*a*4 of the rod 3*a* moved in a circular motion with a diameter of 2.4 cm. The circular motion period was 3 seconds. As a result, the tip 3*a*1 of the rod 3*a* reciprocated in the direction of approaching and moving away from the raw material feed port 2*b*1.

The pellets 4 (styrene elastomer, AR-SC-0, manufactured by Aron Kasei Corporation, elongated, length in the major axis direction: about 4.5 mm, length in the minor axis direction: about 2.5 mm, angle of repose: 40 degrees, Shore A hardness: 0, MFR at 150° C.: 127.52 g/10 min) was fed the hopper 2*a* of the three-dimensional printer 1 having the above configuration, and the extruder 2 was operated at 150° C. while the push-in mechanism 3 was operated for the molding. As the molding progressed, the pellets 4 were pushed into the cylinder 2*b*, resulting in a molded object having the desired shape.

2. Comparative Example 1

Except that the push-in mechanism 3 was not provided, the molding was performed in the same manner as in Example 1. A bridging phenomenon occurred in the pellets 4, and the pellets 4 was not sufficiently fed into the cylinder 2*b*, resulting in molding defects.

3. Comparative Example 2

The molding was performed in the same manner as in Example 1 except that a cylinder mechanism reciprocating in the vertical direction was used instead of the push-in mechanism 3. Although the bridge of the pellets 4 was collapsed by the cylinder mechanism, the pellets 4 was not sufficiently fed into the cylinder 2*b*, resulting in molding defects.
(Second Viewpoint)

1. First Embodiment

A method for producing a molded object of an embodiment of the present invention will be described. This method includes a laminating molding step.

As shown in FIG. 4, in the laminating molding step, the molded object 10 is molded by laminating a single-layer structure 7 formed by moving the head 6 while discharging a strand 25 of a resin in a flowing state from the head 6.

Examples of the molded object 10 include those used in breast bodies such as bra pads and artificial breasts, in the nursing field (for example, bedsore prevention supporters, acetabular foot prevention supporters, and children's bed sheets), and in sports applications (for example, shoe insoles).

The resin constituting the strand 25 is not particularly limited and examples thereof include ABS, polyolefin (for example, polypropylene), polyester, and thermoplastic elastomer.

The strand 25 is linear, and the diameter thereof is, for example, 0.5 to 6.0 mm, preferably 1.0 to 4.0 mm. Specifically, this diameter is, for example, 0.5, 1.0, 1.5, 2.0, 2.5, 3.0, 3.5, 4.0, 4.5, 5.0, 5.5, or 6.0 mm, and may be within the range between any two numerical values exemplified here.

The head 6 is configured to melt the resin fed to the head 6 and discharge the strand 25. The form of the resin fed to the head 6 is not limited, and the resin may be the form of a filament or pellets. In a case where the resin is in the form of a filament, the molten strand 25 in the head 6 may be discharged by moving the filament moved downstream by rotating a gear, which is a gear built into the head 6 and engaged with the filament. In a case where the resin is in the form of pellets, a screw type extruder having a built-in screw may be used as the head 6, and the molten strand 25 in the head 6 may be discharged by the rotation of the screw. In a case where the resin is very flexible, such as a thermoplastic elastomer, it may be difficult to move the filament downstream by gear rotation, so in this case, the head 6 is preferably a screw type extruder.

The strand 25 is discharged onto the molding surface 8. The head 6 and the molding surface 8 are configured to allow relative movement in three-dimensions (that is, in the XYZ directions). The single-layer structure 7 may be formed by moving the head 6 and the molding surface 8 relative to each other within the plane while discharging the strand 25 from the head 6. Relative in-plane movement is preferably achieved, for example, by allowing the molding surface 8 to be immobile and the head 6 to move in-plane, but the molding surface 8 may also be made movable. The strand 25 is in a flowing state at the time point of discharge and is cooled and solidified after discharge.

A first single-layer structure 7 is formed, and the head 6 and the molding surface 8 are moved relative to each other in the height direction so that the distance between the head 6 and the molding surface 8 is opened by one pitch, and a second single-layer structure 7 is then formed on the first single-layer structure 7. As such, by repeating the step of forming the next layer of a single-layer structure 7 on the underlayer of a single-layer structure 7, a molded object 10 constituted by laminated single-layer structures 7 is obtained. The relative movement in the height direction may be performed by raising the head 6 by one pitch, or by lowering the molding surface 8 by one pitch. The ratio of the height of one pitch to the diameter of the strand 25 is, for example, 0.3 to 1.0, and preferably 0.4 to 0.9. Specifically, this ratio is, for example, 0.3, 0.4, 0.5, 0.6, 0.7, 0.8, 0.9, or 1.0, and may be within the range between any two numerical values exemplified here. The height of one pitch may be constant or change during the molding.

As shown in FIG. 5A, the molded object 10 thus formed has a three-dimensional network structure 22. The three-dimensional network structure 22 is a structure made into a network by laminating single-layer structures 7 constituted by the linear resin 22*a*, which is formed by solidifying the strand 25. In a case where the molded object 10 has such a structure, the rigidity of the molded object 10 may vary by varying the spacing between the adjacent linear resins 22*a* or varying the thickness of the linear resin 22*a*.

The diameter of the linear resin 22*a* is, for example, 0.5 to 6.0 mm, and preferably 1.0 to 4.0 mm. Specifically, this diameter is, for example, 0.5, 1.0, 1.5, 2.0, 2.5, 3.0, 3.5, 4.0, 4.5, 5.0, 5.5, or 6.0 mm, and may be within the range between any two numerical values exemplified here.

In one example, the three-dimensional network structure 22 is constituted by repeatedly laminating the single-layer structures 11, 12, and 13 shown in FIG. 5B. The single-layer structure 11 has a linear resin 11*a* constituted by of a plurality of parallel lines provided at intervals from each other. The single-layer structure 12 has a linear resin 12*a* constituted by a plurality of parallel lines provided at intervals from each other. The single-layer structure 13 has a linear resin 13*a* constituted by a plurality of parallel lines provided at intervals from each other. The linear resins 11*a*, 12*a*, and 13*a* are provided so as to extend in a direction deviated from each other by 60 degrees.

Incidentally, the discharging rate of the resin from the head 6 tends to fluctuate depending on the influence of the external environment such as temperature and humidity, the feeding state of the resin to the head 6, and the like. When the discharging rate of the resin decreases or increases, the strand 25 discharged from the head 6 becomes thin or thick, resulting in defective sites such as sites where the linear resin 22*a* constituting the three-dimensional network structure 22 inside the molded object 10 is too thin or too thick. The occurrence of such defective sites causes variations in the quality of molded objects 10.

After the molding of the molded object 10 is completed, the visual inspection and weight measurement of the molded object 10 cannot be used to determine whether or not there are defective areas inside the molded object 10. CT scans need to be used to determine whether or not there are defective sites inside the molded object 10, but CT scans are not only expensive to install but has also a low inspection efficiency.

Under such circumstances, the present embodiment enables inspection of the presence or absence of internal defects in the molded object 10 without using CT scan by inspecting the molded object 10 based on data obtained during the molding.

The data, in the present embodiment, is the weight of the molded object 10 at a time point during the molding. In this case, determination whether or not the molding up to that point has been properly performed may be made by comparing the measurement value of the weight of the molded object 10 at the time point during the molding and the reference value of the weight at the time point. The comparison may be made, for example, by whether or not the difference between the measurement value and the reference value is within the passing range, or whether or not the ratio of the measurement value to the reference value is within the passing range. The reference value is, for example, the weight in a case where the molding is done properly. When the measurement value is close to the reference value, it can be inferred that the discharge amount of the resin up to the measurement time point was appropriate, so that determination can be made that there are no defects at the site formed up to the measurement time point.

Data acquisition may be performed only at one time point during the molding, and an inspection may be performed based on the data, but in such a case, there is a problem in that for example, in a case where there are periods when resin is over-discharged and periods when resin is under-discharged up to the measurement time point and the over- and under-discharges offset each other, the amount of resin discharged may be determined to have been adequate. Therefore, in order to improve the inspection accuracy, it is preferable to acquire data at a plurality of time points during the molding or to acquire data continuously. The shorter the interval between data acquisition, the higher the inspection accuracy, and this interval is preferably 100 minutes or less, for example, still more preferably 10 minutes or less, and still more preferably 1 minute or less. The interval is, for example, 0 to 100 minutes, specifically, for example, 0, 0.001, 0.01, 0.1, 0.5, 1, 2, 3, 4, 5, 6, 7, 8, 9, 10, 50, or 100 minutes, and may be within the range between any two numerical values exemplified here or may be any one of the numerical values exemplified here or less.

FIG. 6 is a graph showing the relationship between molding time, from start of molding to completion of molding, and the reference value of weight. This graph shows the reference value of the increase in the weight of the molded object. From this graph, it can be seen that the reference values of the weights at the time points t1 to t4 of the molding time are rw1 to rw4, respectively. Here, for convenience, the case where data is acquired at four time points is given as an example, but as described above, the shorter the interval between data acquisitions, the more desirable it is.

At the time point of actual molding, it is assumed that the weight of the molded object 10 during the molding is measured at the time points of the molding time t1 to t4, and the measurement value of each is taken as mw1 to mw4. In this case, it is possible to determine whether or not the molding up to the time point has been appropriately performed by comparing the measurement value and the reference value at each time point of the molding time t1 to t4. For example, at the time point of molding time t1, the measurement value mw1 and the reference value rw1 are compared, and the molded object 10 is inspected (pass/fail determination) for the molding up to the time point. In a case where the inspection is passed, the same inspection is performed at each of time points t2, t3, and t4 of the molding time, and when the determination result is found to be passed at all time points, the molded object 10 may be determined to be a passed product (properly molded). On the other hand, when the inspection at any time point of the molding time t1 to t4 is found to be failed at any time point, the molded object 10 may be determined to be a failed product. According to such a method, it is possible to determine whether or not there are defect sites inside the molded object 10 without using CT scan.

The inspection may be performed after the molding of the molded object 10 is completed, or may be performed during the molding of the molded object 10. In a case where the inspection is performed during the molding of the molded object 10, the molding may be stopped when the inspection result is failed. For example, when a result of the inspection at the time point of molding time t1 is failed, molding may be stopped at that time point. In this case, the remaining molding is not performed, saving time and materials. Further, in a case where the inspection is performed during the molding, there is no need to perform inspection after the molding, so the post-molding inspection can be omitted.

The molding surface 8 is preferably the measurement surface of the weigh scale 14. In this case, the weight can be measured in real time without moving the molded object 10 during the molding. The weigh scale 14 may store the acquired data in the built-in storage unit or may be stored in an external storage unit via wired or wireless communication. Further, the inspection based on the acquired data may be performed by the weigh scale 14 itself or by an external computer.

2. Second Embodiment

The present embodiment is similar to the first embodiment, and the main difference is the data acquired during the molding. The following description focuses on the differences.

In the present embodiment, the data acquired during the molding is the thickness of the strand 25 at the time point during the molding. Since the thickness of the strand 25 increases or decreases depending on the amount of resin discharged from the head 6, it is possible to determine whether or not there are defect sites inside the molded object 10 by inspecting whether or not the thickness of the strand 25 is appropriate at the time point during the molding.

The description of data acquisition and inspection is the same as in the first embodiment, and the ideal value of the thickness of the strand 25 may be used as a reference value.

The thickness of the strand 25 may be acquired by, for example, image analysis of an image including the strand

25. Such an image may be acquired using an imaging element such as a CCD or CMOS. In one example, the imaging element is preferably mounted on the head 6. In this case, the imaging element moves with the head 6, so the image including the strand 25 can be acquired immediately after the strand 25 is ejected from the head 6.

3. Other Embodiments

The data acquired during the molding may include both the weight of the molded object 10 during the molding and the thickness of the strand 25 during the molding, and may also include, in addition to these, any of those useful for inspecting the molding state as data obtained during the molding. Furthermore, it may also be determined whether or not the state of the molding during molding is appropriate based on the overall evaluation based on the acquired data.

REFERENCE SIGNS LIST

1: thermal melting three-dimensional printer, 2: extruder, 2a: hopper, 2a1: loading surface, 2b: cylinder, 2b1: raw material feed port, 2c: nozzle, 2d: screw, 2e: motor, 3: push-in mechanism, 3a: rod, 3a1: tip, 3a2: soft portion, 3a3: hard portion, 3a4: root, 3b: driving mechanism, 3b1: motor, 3b2: motor shaft, 3b3: disk, 3b4: bracket, 4: pellets, 4a: molten resin, 5: strand, 6: head, 7: single layer structure, 8: molding surface, 10: molded object, 11: single-layer structure, 11a: linear resin, 12: single-layer structure, 12a: linear resin, 13: single-layer structure, 13a: linear resin, 14: weigh scale, 22: three-dimensional network structure, 22a: linear resin, 25: strand

The invention claimed is:

1. A thermal melting three-dimensional printer comprising:

an extruder; and a push-in mechanism, wherein the extruder includes a hopper, a cylinder, and a nozzle, the hopper is configured to feed pellets into the cylinder through a raw material feed port provided in the cylinder, the extruder is configured to melt and knead, in the cylinder, the pellets fed into the cylinder to form a molten resin and to extrude the molten resin through the nozzle to form a strand, the push-in mechanism is configured to push pellets loaded on a loading surface of the hopper into the cylinder through the raw material feed port, the push-in mechanism includes a rod in contact with the pellet, and a driving mechanism that drives the rod, the rod is driven such that a tip of the rod presses the pellets in a direction of the raw material feed port, the rod includes a soft portion, the rod is driven such that the tip of the rod moves in the direction of the raw material feed port in a state where the rod is pressed against the loading surface to be curved at the soft portion, and a motion in a vertical direction of a root of the rod is converted into a motion of the tip of the rod approaching or moving away from the raw material feed port.

2. The three-dimensional printer of claim 1, wherein the driving mechanism is configured to rotate about a rotating axis extending in a non-vertical direction with respect to the root of the rod.

* * * * *